March 27, 1956   R. L. SINK   2,739,474
VIBRATION MEASURING APPARATUS
Filed July 11, 1949   2 Sheets-Sheet 1

INVENTOR,
ROBERT L. SINK,
BY James B. Christie
ATTORNEY.

March 27, 1956 R. L. SINK 2,739,474
VIBRATION MEASURING APPARATUS
Filed July 11, 1949 2 Sheets-Sheet 2
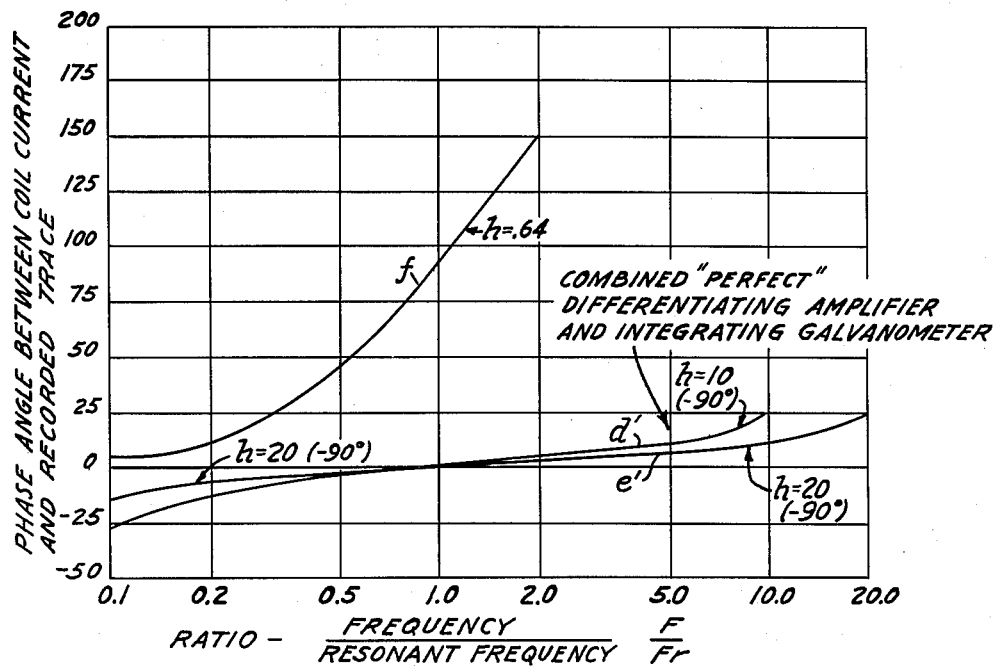
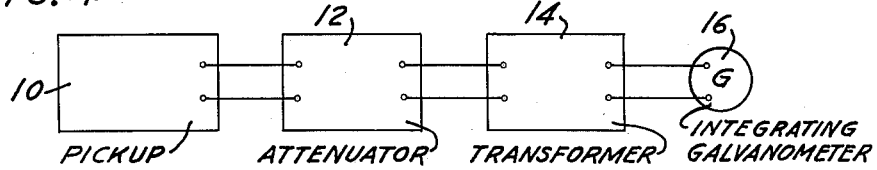
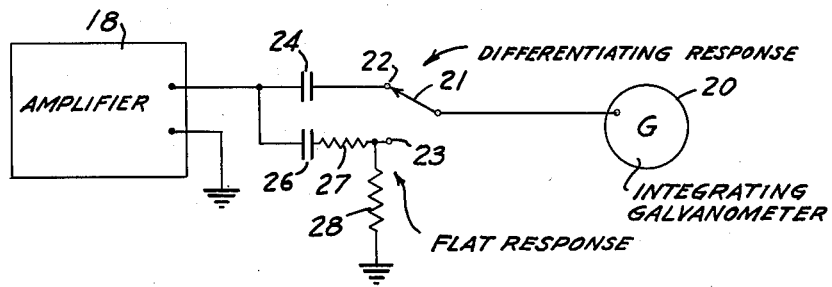
INVENTOR,
ROBERT L. SINK,
BY
ATTORNEY.

United States Patent Office 2,739,474
Patented Mar. 27, 1956

2,739,474

VIBRATION MEASURING APPARATUS

Robert L. Sink, Altadena, Calif., assignor to Consolidated Engineering Corporation, Pasadena, Calif., a corporation of California Application July 11, 1949, Serial No. 104,028

5 Claims. (Cl. 73—70)

This invention relates to electrical systems having a galvanometer as a component part thereof and to galvanometers for use in such systems.

A conventional galvanometer of the moving coil type comprises a coil of wire suspended, usually from a suspension wire, in a magnet field and a mirror mounted on the suspension wire to rotate with the coil. A small current passing through the coil produces a flux therein which causes the coil to revolve in the magnetic field. The angular motion of the mirror represents the balance achieved between the tendency for the coil to rotate in opposition to the restoring forces of the suspension wire.

The natural frequency ($Fn$) of a galvanometer is defined as the frequency at which the mirror will oscillate about its mean position under the stimulus of either a sudden change in the current through the coil or a mechanical shock to the assembly. The resonant frequency ($Fr$) of a galvanometer is the theoretical natural frequency if there is no damping in the system. In practice, however, there is some damping inherent in any galvanometer and the natural frequency is described as a ratio of the resonant frequency and is related to the amount of damping inherent or produced in the instrument in accordance with the following equation:

$$Fn/Fr = \sqrt{1 - h^2} \qquad (2)$$

where $h$ = the per unit damping. The per unit damping ($h$) is defined as a ratio of the damping factor ($C$) to the critical damping factor ($Cc$), the latter factor being determined from the following equation:

$$Cc = 2\sqrt{mk} \qquad (2)$$

where $m$ = the rotational moment of inertia of the coil, mirror and suspension; and
$k$ = the spring constant of the galvanometer assembly in terms of spot displacement.

The conventional coil type galvanometer is normally operated with a per unit damping ($h$) of from about 0.6 to about 0.7. A certain amount of damping is inherent internally in the galvanometer from such sources as windage, mechanical hysteresis, etc. Additional damping is introduced into the galvanometer in one of several ways, as for example, by immersion of all or a portion of the assembly in a damping fluid, electro-magnetic damping, or shorted-turn damping. The object in the past has been to produce galvanometers which will maintain a calibrated response (within allowable limits of error) over a certain frequency range. This frequency range starts at direct current and extends up to some frequency which is usually less than the resonant frequency. The lower the per unit damping, the greater is the useful frequency range, but the greater also is the inherent error across this range (i. e. the greater the deviation from the low frequency responses over the frequency range). The value of $h$ in the region given above results in the optimum balance between frequency range and accuracy in the frequency range. These conditions will be more fully appreciated from the discussion of the accompanying figures.

Galvanometers find extensive use in measuring systems including means for producing a voltage proportional to some function of a physical phenomenon to be measured. An example of such a system is a vibration measuring system wherein it is desired to measure the amplitude of linear or rotational vibration of a test member. Such a system includes a so-called pickup, normally positioned on the test member, and a galvanometer for measuring and in many cases for recording the current developed in the pickup responsive to vibrational displacement thereof. One type of pickup which is frequently used, particularly when the field of interest involves frequencies in excess of approximately seven cycles per second, is a self-generating pickup. A self-generating pickup has the advantage that no oscillator or bridge balancing circuit is required in contrast to other types of pickups which are not self-generating and which depend upon a carrier system. The self-generating pickup, however, generates a current which is proportional to the velocity rather than the amplitude of its displacement. Since displacement is the time integral of velocity, some type of integration is necessary to produce a galvanometer deflection proportional to displacement.

The conventional galvanometer, having a damping factor in the region of say, 0.5 to 1.0, will not integrate the output of such a pickup. The problem has been solved to a certain extent by the use of integrating amplifiers. However, the expense of such apparatus is prohibitive in many applications. Simple integrating circuits using suitable combinations of resistance, inductance and capacitance have also been used but the loss within such circuits and the low sensitivity of high frequency galvanometers necessitate additional amplification. The sensitivity of galvanometers of the type described and damped to the extent discussed above is inversely proportional to the square of the resonant frequency. Since the useful operating frequency of such galvanometers is between D. C. and some frequency less than the resonant frequency, a galvanometer will operate to a high frequency range only at the expense of current sensitivity.

I have now found that by damping a galvanometer to an extent heretofore thought to be completely undesirable, for example, to an extent where $h$ has a value of 10 or more, the characteristics of the galvanometer are materially altered. Moreover, I have found that a galvanometer, damped to this extent, has many applications for which the conventional galvanometer is totally unsuited, and also has many advantages over conventional galvanometers in those applications where they are both adaptable. A galvanometer, in accordance with the invention, damped to a per unit value ($h$) of at least 10 exhibits a response for a constant applied current that is inversely proportional to frequency whereas at frequencies in excess of the resonant frequency, the response of galvanometers damped to a per unit value ($h$) of less than 1 obey the inverse square law.

By the expedient of large damping factors, I have developed what may be termed an integrating galvanometer. An analysis of two of the basic galvanometer equations will illustrate the novel features of a galvanometer in accordance with the invention. The classical expressions for galvanometer response ($x$) and phase angle ($\phi$) are:

$$x = Sdc \frac{1}{\sqrt{[1-(f/Fr)^2]^2 + [2h(f/Fr)]^2}} \quad (3)$$

and $$\tan \phi = 2h \frac{f/Fr}{1-(f/Fr)^2} \quad (4)$$

where
$Sdc$ = D. C. sensitivity in inches/ma.
$f$ = frequency of signal
$Fr$ = resonant frequency of galvanometer
$h$ = damping coefficient
$x$ = deflection for a frequency $f$ per unit current
$\phi$ = angle of phase lag of the galvanometer Examining Equation 3 for conditions wherein the first term under the radical is large compared to the second term, then $$x = Sdc \frac{1}{1-(f/Fr)^2} \cong Sdc \left(\frac{Fr}{f}\right)^2 \quad (5)$$

This represents the condition existing in conventional galvanometers having a damping coefficient ($h$) of less than 1 at operating frequencies substantially greater than the resonant frequency. The response of such a galvanometer in this range is inversely proportional to the square of the frequency ($f$).

Examining Equation 3 as applied to the galvanometer of the invention wherein $h$ is 10 or greater, the second term under the radical is large compared to the first term over a substantial range of frequency:

$$x = Sdc \frac{Fr}{2h.f} \quad (6)$$

Hence, the response ($x$) of a galvanometer having a damping coefficient $h$ greater than 10 is inversely proportional to the frequency over a wide frequency range and in this range functions as an integrating galvanometer. For example with a damping factor of 10, the galvanometer response is inversely proportional to frequency over the range of about 0.1 to 10 times the resonant frequency. With a damping factor of a per unit value of 20, the response is inversely proportional to the frequency over a frequency range of about 0.05 to 25 times the resonant frequency.

In Equation 4, if $h$ is small, say less than 1, $\phi$ will change rapidly with changes in $f$. If on the other hand $h$ is large, say greater than 10, $\phi$ will approach 90° rapidly in the region where $f/Fr$ is less than 0.1 and thereafter will remain at approximately 90° over a wide frequency range. A comparatively constant phase shift constitutes another advantage of the present galvanometer as illustrated more clearly in conjunction with the accompanying drawings.

The invention and its many applications will be more clearly understood from the following detailed description taken in relation to the accompanying drawings in which:

Fig. 3 is a graph of phase angle plotted against the ratio of operating frequency to resonant frequency of galvanometers having different damping factors;

Fig. 4 is a diagram of a circuit including a pickup and a galvanometer in accordance with the invention and Fig. 5 is a diagram of an amplification circuit including the galvanometer of the invention and including means for altering the amplifier output from a flat response to a differentiating output.

Figure 1:
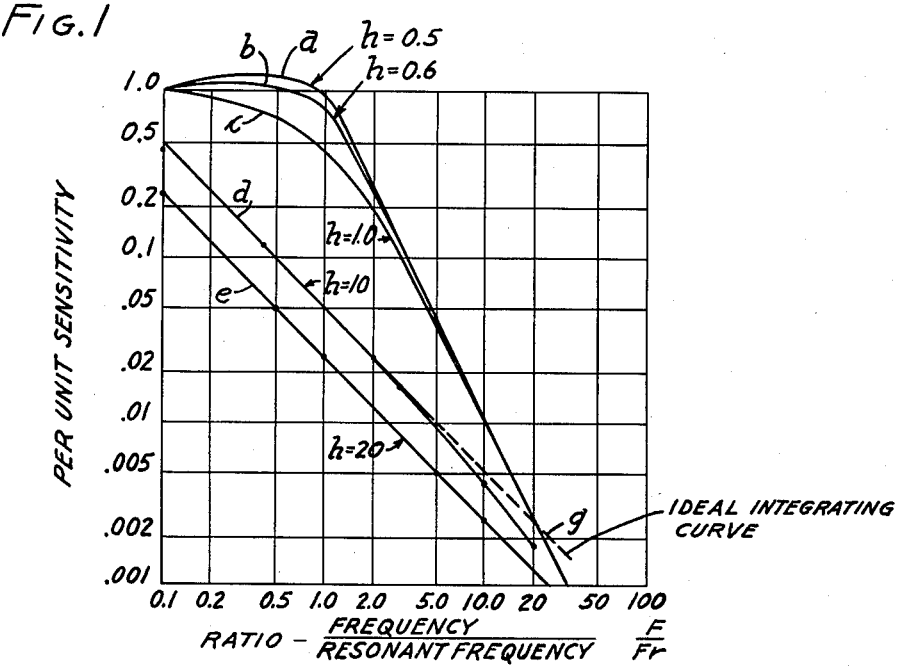
Fig. 1 is a graph of the per unit sensitivity plotted against the ratio of operating frequency to resonant frequency of galvanometers having different damping factors.

Fig. 1 is a graph of galvanometer response wherein the abscissa represents the per unit sensitivity and the ordinant represents the ratio of operating frequency to resonant frequency. Curves $a$, $b$ and $c$ show the sensitivity of three identical galvanometers A, B and C having per unit damping factor values of 0.6, 0.5 and 1.0 respectively, the resonant frequency of these galvanometers being equal to some value $x$. Curves $a$ and $b$ represent what may be taken to be conventional galvanometers which show a fairly flat response between D. C. current and a frequency somewhat less than the resonant frequency. The value 1.0 on the ordinant represents the condition wherein the operating frequency equals the resonant frequency. At operating frequencies above the resonant frequency, the response of galvanometers A, B and C falls off rapidly and in accordance with Equation 5 is substantially inversely proportional to the square of the operating frequency.

Curves $d$ and $e$ represent the response of galvanometers D and E identical to galvanometers A, B, and C except for means of producing the specified per unit damping in accordance with my invention and having the same resonant frequency $x$ as the galvanometers A, B and C. It is immediately apparent that the response of the galvanometers D and E is a straight line over a comparatively wide range of operating frequencies. An ideal integrating galvanometer would show a straight line response from D. C. current to a current of infinite frequency. The line $g$ on the graph of Fig. 1 represents such an ideal integrating curve at a sensitivity corresponding to that of galvanometer D. Galvanometer D, having a damping factor of a value of 10, follows the ideal integrating curve $g$ from approximately one-tenth the resonant frequency to an operating frequency approaching 10 times the resonant frequency of the galvanometer. The galvanometer E having a damping factor of the value of 20 parallels (hence follows) the ideal curve from approximately five-hundredths the resonant frequency to a current frequency of approximately 25 times the resonant frequency.

The straight line inverse frequency response of the galvanometers D and E, damped in accordance with my invention as compared to the inverse square response of the galvanometers A, B and C, clearly shows why the galvanometers D and E will function as integrating galvanometers whereas the galvanometers A, B and C cannot. The inverse frequency response of galvanometers D and E is given by Equation 6.

Figure 2:
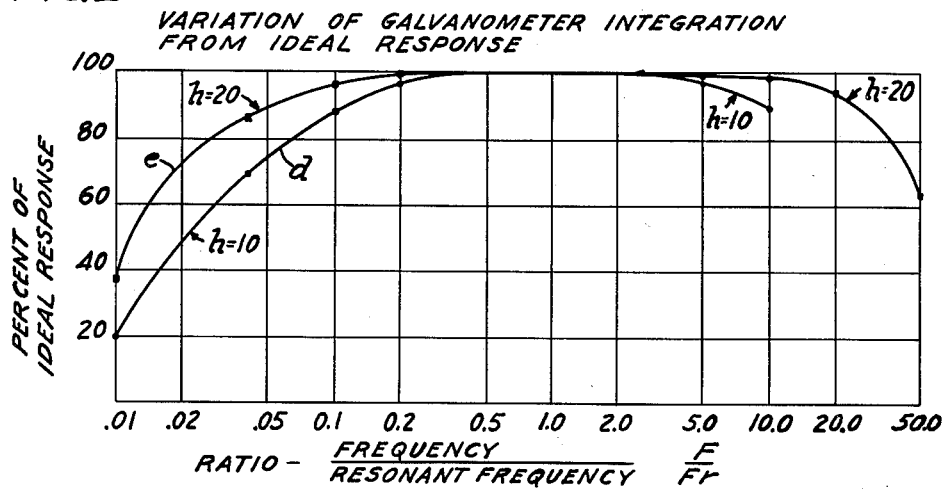
Fig. 2 is a graph of the variation of integrating galvanometer response from that of a perfect integrator for galvanometers having a per unit damping value of 10 and 20.

Fig. 2 is a graph showing the variation of galvanometer integration from an ideal response for galvanometers D and E wherein the abscissa represents the percent of ideal response and the ordinant represents the ratio of operating frequency to resonant frequency. The galvanometer D, damped to a per unit value of 10 maintains this response over a frequency range of approximately 0.1 to 10 times the resonant frequency while galvanometer E, damped to a per unit value of 20, maintains this response over a frequency range of approximately 0.05 to 25 times the resonant frequency.

Fig. 3 is a graph showing the variation of phase angle with frequency for galvanometers D and E (damping coefficients 10 and 20 respectively) and galvanometer F (damping coefficient 0.64) wherein the phase angle between coil current and recorded traces is the abscissa and the ratio of operating frequency to resonant frequency is the ordinant. Curve $f$ rises gradually from a small phase angle at a frequency to resonant frequency ratio of 0.1 to a 90° phase angle at ratio 1. Curves $d'$ and $e'$ are obtained by subtracting 90° from the phase angle of galvanometers D and E as though these galvanometers were coupled to the output of a differentiating amplifier. The reason for this shift of the curves $d'$ and $e'$ will become apparent. In any event the curves $d'$ and $e'$ are seen to be fairly flat over a wide range of frequencies, there being only a comparatively small change in phase angle in the frequency range of 0.1 to 10 times the resonant frequency.

Fig. 4 is a diagrammatic illustration of a circuit showing the application of an integrating galvanometer in accordance with the invention. The circuit of Fig. 4 includes a pickup 10 of the self-generating type wherein the developed current is proportional to the velocity of displacement of the pickup, an attenuator 12, an impedance matching transformer 14, and an integrating galvanometer 16. With the galvanometer 16 having a damping factor of a per unit value of at least 10 in accordance with the invention, the response of the galvanometer is proportional to the amplitude of displacement of the pickup although the current developed by the pickup is proportional to the velocity of displacement. For this reason, no integrating circuit is needed which greatly reduces the cost of the system. Furthermore, having in mind that there are several hundred turns of wire in the conventional pickup, say pickup 10, and there are only approximately 25 turns in the usual galvanometer, a relatively large angular rotation of the galvanometer is obtained with only a small movement of the seismic element within the pickup. Hence, no amplification is required in the system of Fig. 4. For both of these reasons the system of Fig. 4 represents an inexpensive and accurate solution to the problem of integrating the output of a self-generating type pickup.

As a preferred embodiment the circuit of Fig. 4 is shown as including an impedance matching transformer and an attenuator although neither of these elements are necessary to the operation thereof. It is entirely feasible to couple a galvanometer in accordance with the invention directly to the output of a pickup without intervening circuit elements. However, the transformer and attenuator will increase the sensitivity and versatility of the circuit.

It is a fundamental law that the total flux linkages within a closed loop system tend to remain constant. The movement of the seismic element in a conventional velocity pickup results in changes in the number of flux linkages within the pickup, and the galvanometer element of the apparatus of Fig. 4 would tend to rotate so as to maintain these flux linkages constant if the resistances within the circuit were substantially zero. For an ideal arrangement having substantially zero resistance, the rotation of the galvanometer element must be directly proportional to the displacement of the seismic element of the pickup in order to conform to the fundamental law that the total flux linkages within a closed loop system tend to remain constant. Hence, for the ideal case of substantially zero resistances, the galvanometer element must move in accordance with the integral of the individual signals produced by the velocity pickup in order to move in proportion to the displacement of the seismic element of the pickup.

The condition of substantially zero resistance within the closed loop would provide a very large amount of damping in the galvanometer. In practice, it has been found that a per unit damping factor of 10 or more provides the desired integrating action over a frequency range from at least 0.1 to 10 times the resonant frequency of the galvanometer. The frequency range can be extended by making the damping factor larger.

Also, it has been found that the source of damping may be any conventional type, and it is not limited to electromagnetic damping which is determined by the resistance within the closed loop.

The integrating galvanometer of the invention may be coupled in an amplifier circuit having a flat response to produce an overall integrated response. Alternatively, the integrating galvanometer may be coupled to a differentiating amplifier to give an overall flat response. A differentiating amplifier may be defined as an amplifier having a gain linearly proportional to frequency as compared to a flat response amplifier, the gain of which is independent of frequency. Fig. 5 shows a circuit including an amplifier 18, a galvanometer 20, a switch 21 and alternate means coupled in the amplifier output to impart to the output a flat response or a differentiating response as desired. These means include alternate branches of the amplifier output connected to terminals 22, 23 of switch 21. One branch connected to terminal 22 includes a condenser 24, the reactance of which is large compared to the load so that the current passing through this branch will be a function of frequency. This branch, i. e. feeding output terminal 22 furnishes a differentiated output. The alternate branch, feeding output terminal 23 includes a condenser 26, a series resistor 27 and a grounded resistor 28. The reactance of condenser 26 is small compared to that of condenser 24 so that the output through terminal 23 is independent of frequency, i. e. flat response. Resistors 27, 28 are necessary to attenuate the signal in this branch.

It should be remembered that heretofore, the reasonable operating frequency range of a galvanometer has been considered to be approximately 64% of the resonant frequency. The arrangement of a differentiating amplifier and a galvanometer as shown in Fig. 5 to obtain a flat response has many advantages over a simple linear amplification. Because of the sensitivity of the integrating galvanometer, it is possible to eliminate an output transformer normally coupled between an amplifier and galvanometer. This is a real advantage since output transformers are quite expensive and since the associated circuit required when an output transformer is employed is somewhat more complex and critical. Furthermore, this combination of a differentiating amplifier and integrating galvanometer results in improved transient response, because of the nature of the wave form fed to the galvanometer from a differentiating amplifier and because of the linear response of the galvanometer thereto. Additionally, the phase-shift characteristics obtained with a combination of differentiating amplifier and integrating galvanometer are somewhat more favorable for this combination than for the usual arrangement. The effect on phase shift of the combination of a differentiating amplifier and an integrating galvanometer are apparent from curves $d'$ and $e'$ of Fig. 3.

The alternative arrangement illustrated in Fig. 5, i. e. with switch 21 connected to terminal 23 comprises the combination of a flat response amplifier output and an integrating galvanometer. This arrangement enables one to obtain an integrated response heretofore impossible with a simple flat response amplifier.

Although Fig. 5 shows a circuit including means for obtaining a flat response and a differentiating response from amplifier 18, it is clear that the invention contemplates combination of an integrating galvanometer with an amplifier having either type of output to the exclusion of the other. From a practical standpoint, the circuit of Fig. 5 is preferred since it lends itself to a wider variety of uses for only a slightly greater initial cost.

The high damping necessary in the galvanometer of the invention may be obtained in two ways. First, the source of impedance of the galvanometers is maintained as low as possible consistent with efficient power transmission. Secondly, fluid damping may be used to increase the total damping to give a per unit damping value of 10 or more.

As illustrated in Fig. 1, an increase of the damping coefficient from 10 to 20 will halve the sensitivity but increase the frequency range approximately 4 times. To damp a galvanometer to this high level requires a damping oil of higher viscosity than is normally employed. The required viscosity of the damping fluid is a function of galvanometer coil size and characteristics of the particular type of galvanometer.

A damping value of at least 10 is taken as a minimum since the range of frequencies over which a galvanometer of lower damping factor will respond linearly is so low as to make it virtually of no use. Of course, comparatively small deviations from the value of 10 will not have a sufficiently great effect to materially impair the operation of a galvanometer.

The invention herein described comprises an improved galvanometer wherein characteristics entirely different from those presently achieved in galvanometers are obtained by damping a coil type galvanometer far in excess of the amount of damping presently used and in direct opposition to the generally accepted theory that the lower the damping consistent with allowable error, the greater will be the useful frequency range of the galvanometer. Moreover, the invention comprises novel electrical circuits including in combination, a galvanometer in accordance with the invention wherein the per unit damping factor is of a value of 10 or more. Several such circuits have been shown diagrammatically and other circuits may be developed which take advantage of the improved galvanometer of the invention without departing from the scope of the invention.

I claim:

1. In an electrical circuit having a source which provides electric signals composed of sinusoidal components having a predetermined frequency range, and a galvanometer coupled to the source of electric signals, the galvanometer having a deflectable member which moves in response to the flow of an electric signal through it, with the galvanometer being provided with resilient means for restoring the deflectable member to a predetermined reference position when no electric signal is applied to it, the improvement which comprises a source of damping coupled to the deflectable member of the galvanometer for providing a per unit damping factor of at least 10 for the deflectable member and causing the individual deflections of the deflectable member away from and back to the reference position to be in accordance with the integral of the voltage excursions of the electric signals over a frequency range of at least 0.1 to 10 times the resonant frequency of the deflectable member, so that the magnitudes of the respective deflections of the deflectable member are inversely proportional to the frequency of the electric signals which are applied to it.

2. The apparatus of claim 1 wherein the source of electric signals is a self-generating velocity pickup for providing an electric voltage which is proportional to the velocity of displacement of the pickup, so that the respective deflections of the deflectable member from the reference position are directly proportional to the amplitudes of the corresponding displacements of the velocity pickup.

3. The apparatus of claim 1 wherein the source of electric signals includes an amplifier having a substantially flat amplification response over the operating frequency range, so that the displacement of the deflectable member is in accordance with the integral of the individual electric electric signals which are applied to the input of the amplifier.

4. The apparatus of claim 1 wherein the source of electric signals includes a circuit for differentiating the signals which are applied through the source to the galvanometer, so that the response of the galvanometer and the phase angle between the current through the deflectable member and the movement of the deflectable member are substantially flat over the operating frequency range.

5. In a galvanometer having a deflectable member which moves in response to the flow of an electric current through it and which is provided with resilient means for restoring the deflectable member to a predetermined reference position when no electric current is applied to it, the improvement which comprises a source of damping coupled to the deflectable member for providing a per unit damping factor of at least 10 for the deflectable member and causing the individual deflections of the deflectable member away from and back to the reference position to be in accordance with the integral of the individual voltage excursions of the electric signals which are applied to it over a frequency range of at least 0.1 to 10 times the resonant frequency of the deflectable member, so that the magnitudes of the respective deflections of the deflectable member are inversely proportional to the frequency of the electric signals which are applied to it.

References Cited in the file of this patent

UNITED STATES PATENTS

| 2,054,672 | Edgar | Sept. 15, 1936 |
| 2,251,436 | Bentley et al. | Aug. 5, 1941 |
| 2,344,217 | Reason | Mar. 14, 1944 |
| 2,510,585 | Kellogg | June 6, 1950 |
| 2,564,300 | Culver et al. | Aug. 14, 1951 |
| 2,638,492 | Schmitt | May 12, 1953 |

OTHER REFERENCES

"The Grossot Fluxmeter," February 15, 1906.